United States Patent [19]

Maucher

[11] 3,981,228
[45] Sept. 21, 1976

[54] HYDRAULIC CONTROL SYSTEM
[75] Inventor: Edmund Maucher, Stuttgart, Germany
[73] Assignee: Robert Bosch G.m.b.H., Stuttgart, Germany
[22] Filed: Oct. 24, 1974
[21] Appl. No.: 517,810

[30] Foreign Application Priority Data
Nov. 13, 1973 Germany............................ 2356607

[52] U.S. Cl. ................................... 91/415; 91/436; 91/465; 91/DIG. 2
[51] Int. Cl.² .................. F15B 11/08; F15B 13/042
[58] Field of Search ............. 91/465, 415, 416, 436, 91/420, DIG. 2

[56] References Cited
UNITED STATES PATENTS

| 523,419 | 7/1894 | Thorpe | 91/436 X |
|---|---|---|---|
| 2,376,519 | 5/1945 | Stacy | 91/415 |
| 3,169,453 | 2/1965 | Westveer | 91/420 |
| 3,759,144 | 9/1973 | Ikeda | 91/436 |
| 3,863,547 | 2/1975 | Meier et al. | 91/416 |

FOREIGN PATENTS OR APPLICATIONS

| 525,281 | 8/1940 | United Kingdom | 91/420 |

Primary Examiner—Irwin C. Cohen
Attorney, Agent, or Firm—Michael J. Striker

[57] ABSTRACT

A double-acting user has a first and an oppositely acting second pressure-fluid compartment. A source of pressure fluid receives fluid from a fluid reservoir. A first conduit has one section communicating with the first compartment of the user, and another section communicating with the source of pressure fluid. A second conduit communicates with the reservoir. A control valve is interposed in the first conduit and is movable between a first position in which it connects the sections of the first conduit with one another and a second position in which it connects both of the sections of the first conduit with the second conduit. A pressure-reducing and limiting valve has a first port communicating with the second compartment of the user, a second port communicating with the reservoir, a third port communicating with that section of the first conduit which in turn communicates with the source, and a pressure-limiting arrangement which serves to limit the fluid pressure in the second compartment of the user.

9 Claims, 1 Drawing Figure

U.S. Patent  Sept. 21, 1976  3,981,228
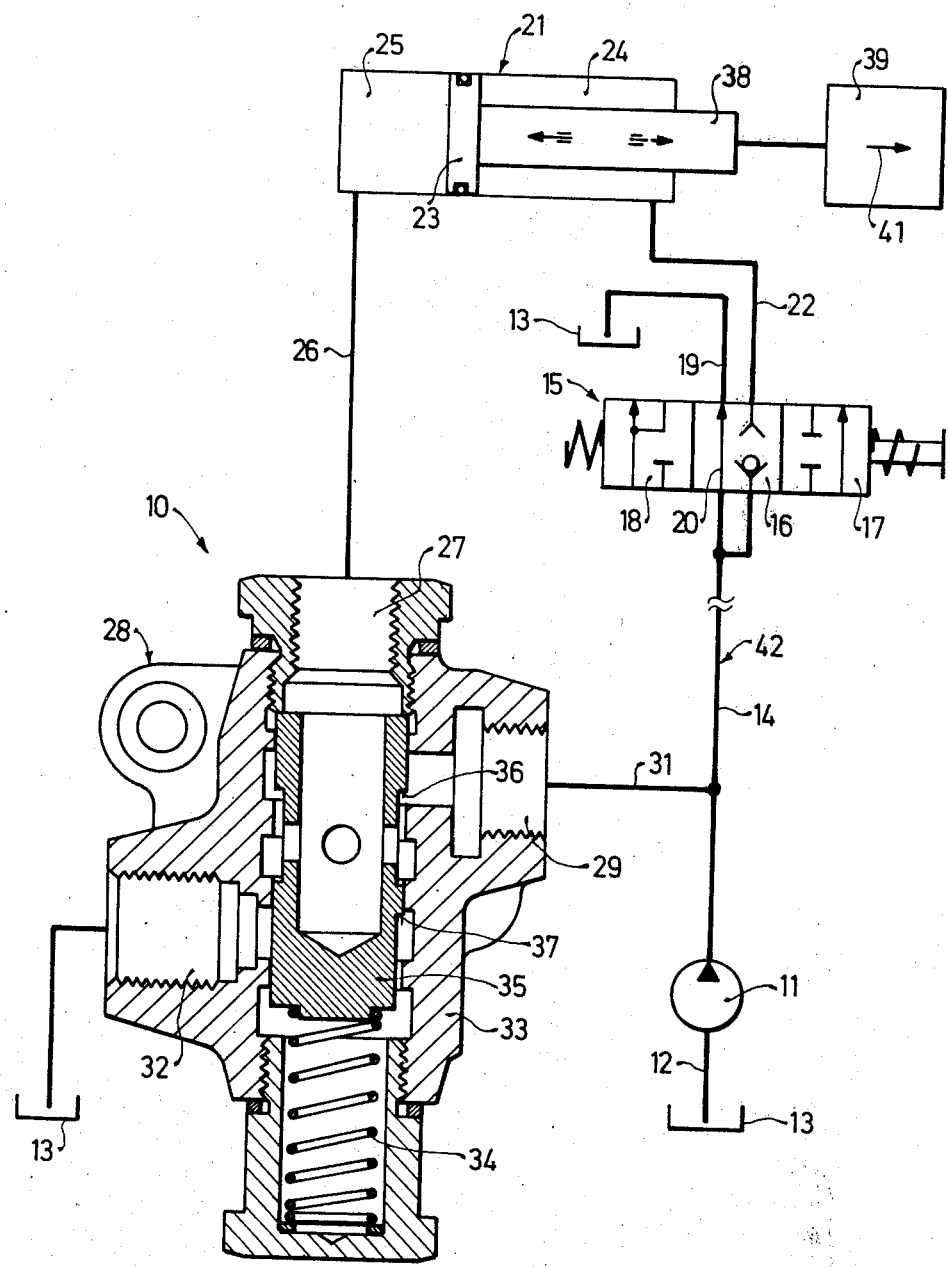

HYDRAULIC CONTROL SYSTEM

BACKGROUND OF THE INVENTION

The present invention relates to a hydraulic control system, and more particularly to a hydraulic control system of the type having a source of pressure fluid and a control valve which supplies pressure fluid from the source to a double-acting user and returns the pressure fluid from the user into a reservoir.

Hydraulic control systems of this general type are already known. A prior-art system uses a four-port, three-position slide valve which is connected with a double-acting user by means of two hydraulic fluid conduits. Located ahead of the slide valve is a pressure reducing valve to assure that the user can be controlled at a pressure that is lower than the pressure fluid supplied by the pump of the system.

This prior-art hydraulic control system is fully operative but is relatively complicated and expensive. In certain applications, in which a load usually acts upon the user in a predetermined direction, such systems are more complicated and expensive than the requirements of the application warrant, which is particularly true when an undesired descending of the load is to be prevented, under which circumstances a control valve must be used of the type having valve seats and a cooperating valve member.

Another hydraulic control system known from the prior art is used for lifting and lowering a hydraulically powered arm of an agricultural machine, such as a tractor or the like. In that system there is a single-acting cylinder provided the operation of which is controlled by valves of the type having seats and cooperating valve members. This is a simple system in its construction, and serves to reliably seal the fluid pressure space in the cylinder. However, in this particular system, it has been found that if there is no load actng upon the arm which is to be controlled, the inherent friction of the arm and the associated components may be sufficiently high so that in the absence of a load, the arm will descend either only very slowly or not at all, thus making the arrangement quite difficult to use when this occurs.

SUMMARY OF THE INVENTION

It is, accordingly, a general object of the present invention to provide a novel hydraulic control system which avoids the disadvantages of the prior art.

More particularly, it is an object of the present invention to provide an improved hydraulic control system wherein the difficulties of the prior art are reliably avoided, and wherein the construction is quite simple and uncomplicated and therefore inexpensive.

Another object of the present invention is to provide such a control system, wherein the user can be reliably and accurately controlled even when there is no load or other external force acting upon the user.

Still a further object of the invention is to provide such a novel hydraulic control system which is to be as loss-free as possible and which is to be highly versatile in its possible applications.

In keeping with these objects, and with others which will become apparent hereafter, one feature of the invention resides in a hydraulic control system which, briefly stated, comprises a double-acting user having a first and an oppositely acting second pressure fluid compartment, a fluid reservoir, and a source of pressure fluid communicating with this fluid reservoir. First conduit means is provided with one section communicating with the first compartment, and another section communicating with the source. Second conduit means communicate with the reservoir. Control valve means is interposed in the first conduit means and movable between a first position in which it connects the sections of the first conduit means with one another, and a second position in which it connects the second conduit means with both of the sections of the first conduit means. Pressure-reducing and pressure-limiting valve means is provided, including a first port communicating with the second compartment, a second port communicating with the reservoir, a third port communicating with the other section of the first conduit means, and pressure-limiting means operative for limiting the fluid pressure in the second compartment.

This system as just briefly outlined above, is evidently of simple and uncomplicated construction, and in particular its control valve means can be of a simple construction which, nevertheless, assures that the piston of a double-acting user cannot only held in position against movement, but can also be retracted under load or can be extended under no-load conditions. The system according to the present invention operates with rather low energy losses and, because it is reliable and simple in its construction, requires very little maintenance.

The novel features which are considered as characteristic for the invention are set forth in particular in the appended claims. The invention itself, however, both as to its construction and its method of operation, together with additional objects and advantages thereof, will be best understood, from the following description of specific embodiments when read in connection with the recompanying drawings.

BRIEF DESCRIPTION OF THE DRAWING

The single FIGURE illustrates by way of example a hydraulic control system according to the present invention.

DESCRIPTION OF THE PREFERRED EMBODIMENTS

Referring to the drawing now in detail it will be seen that the control system illustrated therein is designated in toto with reference numeral 10. It has a source of pressure fluid in form of a pump 11 which draws its hydraulic fluid from a reservoir 13 via a suction conduit 12 and expels it into a pressure conduit 14. The pressure conduit 14 constitutes one section of a two-section conduit, the other section of which is identified with reference numeral 22 and communicates with the annular space 24 formed in a cylinder of a double-acting user (here illustrated as a cylinder and piston arrangement having a differential piston 23) by the presence of a piston rod 38 which extends from the piston 23 to the exterior of the cylinder of the user 21. The annular space 24 is located at one axial end of the piston 23, and a further space 25 is located at the opposite axial end of the piston 23.

Interposed between the sections 14 and 22 is a three-position control valve 15 which is constructed as a valve having valve seats, in order to provide an improved sealing effectiveness. The control valve 15 is movable between three positions, namely a neutral position 16, a load-lifting position 17, and a load-lowering position 18. When the valve 15 is in the neutral position 16 it connects the section 14 of the conduit via a channel 20 with a return flow conduit 19 that communicates with the reservoir 13; at the same time it prevents the flow of fluid from the section 14 into the section 22, which latter is also disconnected from the conduit 19. When the valve 15 is in the position 17 it connects the section 14 only with the section 22 and disconnect it from the conduit 19, whereas in the position 18 the valve 15 connects the conduit sections 14 and 22 both with the conduit 19.

A connecting conduit 26 connects the space 25 in the user 21 with a port 27 of a pressure-reducing valve 28 which in this embodiment also serves a pressure-limiting function, as will be explained subsequently. A further port 29 of the valve 28 communicates with the section 14 via a branch conduit 31. Still a third port 32 of the valve 28 communicates with the reservoir 13. The valve 28 has a housing 33 in which a hollow shiftable valve member 35 is longitudinally movable, being permanently urged to its illustrated normal position by the biasing spring 34. In this normal position which is illustrated the valve member 35 establishes via a first control edge 36 a fluid communication between the port 29 and the port 27, whereas a second control edge 37 prevents a communication between the ports 27 and 32. When the valve member 35 is moved from the illustrated position against the force of the biasing spring 34, it can move to a further position in which the control edge 36 interrupts the communication between the ports 27 and 29, thereby limiting the pressure in the port 27 and hence via the conduit 26 in the space 25 to a pressure which is determined by the force of the spring 35 and is lower than the pressure prevailing in the port 29. The valve member 35 can further move against the force of the biasing spring 34 to an additional position which it assumes when the pressure prevailing in the port 27 exceeds a predetermined limit, to a relief position in which the control edge 37 permits a fluid communication between the ports 27 and 32. It is clear, therefore, that the valve 28 has not only a pressure-reducing function but also — with reference to the port 27 — a pressure-limiting function.

A load 39 is diagrammatically illustrated as being connected with the piston road 38 of the user 21, and as acting permanently in the direction of the arrow 41, that is permanently tending to shift the piston 23 towards the right. Such a load may for instance be an arm of a powered agricultural implement or the like, although of course the invention is by no means limited to such an application, which arm permanently tends to swivel downwardly under the influence of gravity and/or equipment or other objects connected to the arm. For purposes of explanation of the operation of the system, it will be assumed hereafter that the conduit section 14, the channel 20 and the conduit 19 together constitute a neutral flow circuit 42.

Keeping the above comments in mind, and assuming that the load 39 is indeed connected with the piston rod 38 and exerts force in the direction of the arrow 41 it will be seen that in operation of the system — and assuming that the valve 15 is in the neutral position 16 — the pump 11 will pump pressure fluid via the neutral flow circuit 42 back into the reservoir 13. The neutral-flow circuit 42 opposes to the flow of the stream of pressure fluid a certain small flow resistance, so that the pump 11 must produce a certain neutral flow pressure which acts via the branch conduit 31, the port 29 and the port 27 upon the space 25 of the user 21. As long as this neutral-flow pressure is below the pressure which is pre-selected with the pressure-reducing valve 28, the valve member 35 of the valve 28 will remain in the normal position which is illustrated in the drawing. The pressure thus acting in the space 25 exerts upon the differential piston 23 a force acting towards the right in the drawing, that is in the direction of the arrow 41. However, the piston 23 cannot move towards the right because when the valve 16 is in the neutral position as illustrated the piston 24 is prevented from such movement due to the fact that the outflow of fluid from the space 24 is reliably prevented. Thus, the load 39 is held against any movement.

When it is desired to let the load 39 descend, by making the piston 23 and the piston rod 38 shift towards the right in the drawing, the valve 15 is switched from the illustrated neutral position to the lowering position 18. Now, pressure fluid can escape from the space 14 as the piston 23 is urged towards the right under the influence of the neutral-flow pressure acting in the space 25, and the expelled pressure fluid from the space 24 can travel via the valve 15 and conduit 19 to the reservoir 13. At the same time, pressure fluid flows from the neutral-flow circuit via the branch conduit 31, the valve 28 and the connectng conduit 26 into the space 25, so that the piston 23 moves towards the right. Excess pressure fluid supplied by the pump 11 flows via the channel 20 and the conduit 19 back into the reservoir 13. The combined force of pressure fluid in the space 25 and of the load 39 serves to effect a rapid movement of the piston 23 towards the right, so that the load 39 is lowered.

When the load 39 is to be lifted, that is when the piston 23 is to be retracted towards the left in the drawing, then the valve 15 is switched to its position 17 in which the neutral-flow circuit 42 is blocked so that the pump 11 now builds up pressure in the conduit sections 14 and 22. This pressure build-up is communicated via the branch conduit 31 to the valve 28 and rapidly reaches the point where it exceeds the value that was preselected with the pressure reducing valve 28. When this point is reached, the valve member 35 moves to its position in which it interrupts communication between the ports 29 and 27, so that the pressure build-up in the conduit section 14 can further proceed without hinderance. Pressure fluid now flows via the valve 15 and the conduit section 22 into the annular space 24, shifting the piston 23 towards the left and raising the load 39. Pressure fluid which is present in the space 25 is expelled by the leftward moving piston 23 via the connecting conduit 26 into the port 27 and travels via the valve 28, which also performs a pressure limiting function as mentioned earlier, into the port 32 and from there back to the reservoir 13. The pressure which is selected with the pressure reducing valve is relatively low and is only slightly above the neutral flow pressure which develops in the system, so that no significant energy losses occur during lifting of the load.

In the event that no load is connected with the piston 23 and the piston rod 38 thereof, the operations described with respect to the neutral position 16 of the valve 15, and the raising or lifting position 17 thereof, are the same as has been described above. However, when the piston 23 is to be moved toward the right with the valve 15 and its position 18, the previously available force exerted by the load 39 is no longer available to help move the piston 23 to the right and expel pressure fluid from the space 24. Under these circumstances only the neutral flow pressure existing in the system as a result of the pumping of fluid by the pump 11 will be present in the space 25, serving to push the piston 23 towards the right. The pressure in the space 24 will be almost equal to the pressure prevailing in the return flow conduit 19. The difference between these two pressures should always be so selected — depending upon the particular system — that frictional resistance can be reliably overcome by the pressure in the space 25 so that the piston 23 can be moved towards the right even when no load acts upon it. For this purpose, neutral flow pressure, the pressure selected with the valve 28, and the effective piston surfaces on the piston 23, must be appropriately coordinated with one another.

One highly advantageous area of application of the novel hydraulic control system is in the raising and lowering of hydraulically operated arms, booms or the like on agricultural machinery, such as agricultural tractors. It is there necessary that a pressure chamber of the cylinder and piston unit which effects the raising and lowering of the arm, must be controlled by a single fluid conduit and a reliably operating valve which controls the flow in the fluid conduit. The inherent friction in the components of such a system can be so great that if no load in form of such equipment as plows or the like is connected with the cylinder and piston unit, the arm to which such equipment is connected and which in turn is raised or lowered by the cylinder and piston unit, may in the absence of such load be movable in downward direction only very slowly or not at all. Such downward movement is, however, necessary in order to permit the connection of the arm with the auxiliary implement such as the plow or the like. In such a case the use and control of the differential piston 23 in the system of the present invention is particularly advantageous and permits a low pressure valve to be preselected with the valve 28.

The novel system can also be advantageously used in other applications, for instance in such applications where an item of equipment is to be controlled for movement in one direction, whch will not under its own weight return from one direction towards the other direction. One such application is in the case of street-cleaning machines where the item of equipment — namely the brush which is to brush the street — must be pressed against the street surface with a constant force and cannot be returned under its own weight, but only by appropriate operation of a control valve.

It will be appreciated that various modifications of the system according to the present invention are possible without departing from the concept and intent of the invention. The user 21 could, for instance, utilize a symmetrical piston rather than a differential piston. The valve 15 could be provided with additional ports so as to control additional functions beyond those which have been described and illustrated. Other valves could also be interposed in the conduit 14, and the combined function of pressure limitation and pressure reduction which is performed by the valve 28 in the illustrated system could be separated and each function could be carried out by one of two discrete valves. The system according to the present invention can of course also be used to regulate a constant force, for instance the constant force with which the brush of the street cleaning machine must be pressed against the street surface.

It will be understood that each of the elements described above, or two or more together may also find a useful application in other types of constructions differing from the types described above.

While the invention has been illustrated and described as embodied in a hydraulic control system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hydraulic control system, comprising a double-acting user having a first and an oppositely acting second pressure-fluid compartment and a pressure responsive element therebetween and being arranged to move in a first direction counter to the urging of a load at one speed which is substantially uniform over the entire stroke length, and in a second direction with or without the urging of a load; a fluid reservoir; a source of pressure fluid communicating with said fluid reservoir; first conduit means having one section communicating with said first compartment, and another section communicating with said source; second conduit means communicating with said reservoir; and means for effecting movement of said element in said second direction without the urging of a load at another speed which is also substantially uniform over the entire stroke length, comprising control valve means interposed in said first conduit means and movable between a first position in which it connects said sections with one another, and a second position in which it connects said second conduit means with both of said sections, and pressure-reducing and pressure-limiting actuating valve means, including a first port communicating with said second compartment, a second port communicating with said reservoir, a third port communicating with said other section of said first conduit means, and pressure-limiting means operative for limiting the fluid pressure in said second compartment, said pressure limiting means comprises a valve member having a pressure responsive face directly and continuously open to said second compartment, said valve member being movable between one position in which it normally connects said third port with said first port, another position in which it connects said first port with said second port, and a further position in which it disconnects all of said ports from one another; and biasing means normally biasing said valve member to said one position.

2. A control system as defined in claim 1, wherein said control valve means is also movable to a third position in which it connects said second section of said first conduit means only with said second conduit means, to that pressure fluid from said source is recirculated to said reservoir.

3. A control system as defined in claim 1, wherein said biasing means comprises a spring dimensioned to yield and permit movement of said valve member from said one to said other position when the pressure in said second compartment exceeds a predetermined limit.

4. A control system as defined in claim 1, wherein said user comprises a cylinder and said element is a differential piston slidable in said cylinder and having a piston rod projecting from one end and extending through said cylinder, said first compartment being an annular compartment formed in said cylinder adjacent said one end of said piston by said piston and piston rod, and said second compartment being formed in said cylinder adjacent the other end of said piston.

5. A control system as defined in claim 1, wherein said user is connected with a load-lifting arm for raising and lowering the same.

6. A control system as defined in claim 1, wherein said third port communicates with said other section of said first conduit means in the region of said source.

7. A control system as defined in claim 1, wherein said source is a hydraulic pump.

8. A control system as defined in claim 1, wherein said control valve means comprises valve seats, and a valve member engageable with said valve seats in the respective positions of said control valve means.

9. A control system as defined in claim 1, wherein said control valve means disconnects in said first position said second conduit means from said sections.

* * * * *